US 8,115,432 B2

(12) United States Patent
Doffin et al.

(10) Patent No.: US 8,115,432 B2
(45) Date of Patent: Feb. 14, 2012

(54) TRIPHASE ROTATING ELECTRICAL MACHINE

(75) Inventors: Hugues Doffin, Chatenay Malabry (FR); Farouk Boudjemai, Marcoussis (FR); Ertugrul Taspinar, Sucy en Brie (FR); Julien Masfaraud, Paris (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 616 days.

(21) Appl. No.: 12/301,845

(22) PCT Filed: May 10, 2007

(86) PCT No.: PCT/FR2007/051245
§ 371 (c)(1),
(2), (4) Date: Nov. 21, 2008

(87) PCT Pub. No.: WO2007/138211
PCT Pub. Date: Dec. 6, 2007

(65) Prior Publication Data
US 2010/0231152 A1   Sep. 16, 2010

(30) Foreign Application Priority Data
Jun. 1, 2006 (FR) ..................................... 06 51996

(51) Int. Cl.
*H02P 6/20* (2006.01)
(52) U.S. Cl. ............... 318/400.09; 318/400.11; 318/504
(58) Field of Classification Search ............ 318/400.01, 318/400.09, 400.11, 400.26, 400.3, 400.41, 318/432, 433, 437, 504, 700, 720–724
See application file for complete search history.

(56) References Cited

U.S. PATENT DOCUMENTS

| 3,746,941 | A | * | 7/1973 | Ageev et al. ............. 318/400.04 |
| 3,805,127 | A | * | 4/1974 | Svendsen ..................... 318/139 |
| 4,211,961 | A | * | 7/1980 | Marumoto et al. ........... 318/139 |
| 4,218,730 | A | * | 8/1980 | Marumoto et al. ........... 363/124 |
| 4,788,478 | A | * | 11/1988 | Ishii et al. ..................... 388/811 |
| 5,043,641 | A | | 8/1991 | Feigel et al. |
| 5,097,140 | A | * | 3/1992 | Crall .......................... 290/36 R |
| 5,296,787 | A | * | 3/1994 | Albrecht et al. ............... 318/433 |
| 5,821,722 | A | * | 10/1998 | Forbes et al. .................. 318/696 |
| 6,362,582 | B1 | | 3/2002 | Bernauer et al. |
| 6,646,407 | B2 | * | 11/2003 | Rahman et al. ............... 318/701 |
| 2002/0014870 | A1 | | 2/2002 | Krotsch et al. |

FOREIGN PATENT DOCUMENTS

GB    2 307 805 A   4/1997
WO   WO 03/042999 A1   5/2003

* cited by examiner

*Primary Examiner* — Bentsu Ro
(74) *Attorney, Agent, or Firm* — Berenato & White, LLC

(57) ABSTRACT

A triphase rotating electric machine includes three coils evenly distributed around a rotational axes of the machine, and at least one first sensor, capable of generating a periodic signal to represent the position of the machine around the axle and a control circuit capable of controlling, when in the first mode, the conduction of a switch (KUH), linked to at least one of the three coils based on the periodic signal generated by the first sensor (U), such that the conduction phases of the switch (KUH) have a duration in the order of half the signal period (U). The control circuit is capable of controlling switch (KUH), based on a second mode in which the conduction phases of the switch (KUH) have a duration in the order of a third of the signal period (U).

10 Claims, 4 Drawing Sheets

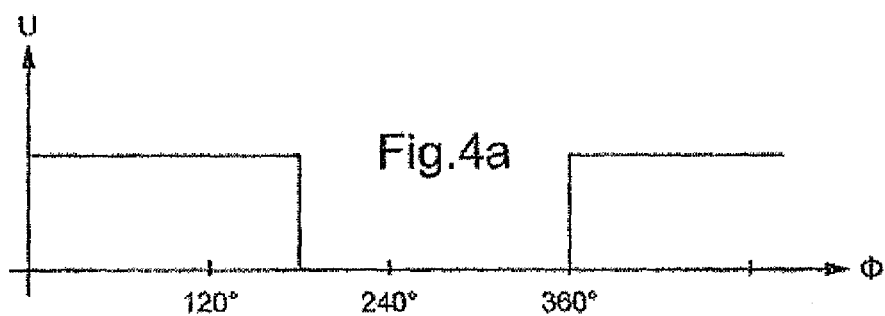
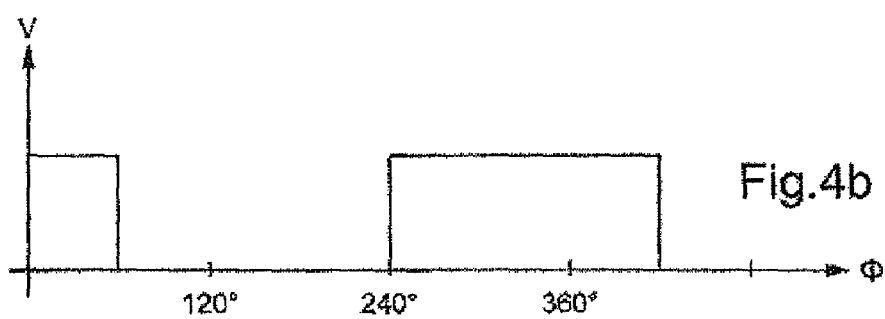
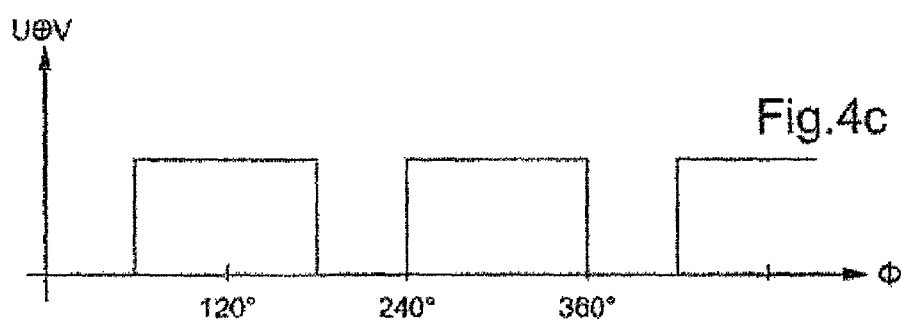
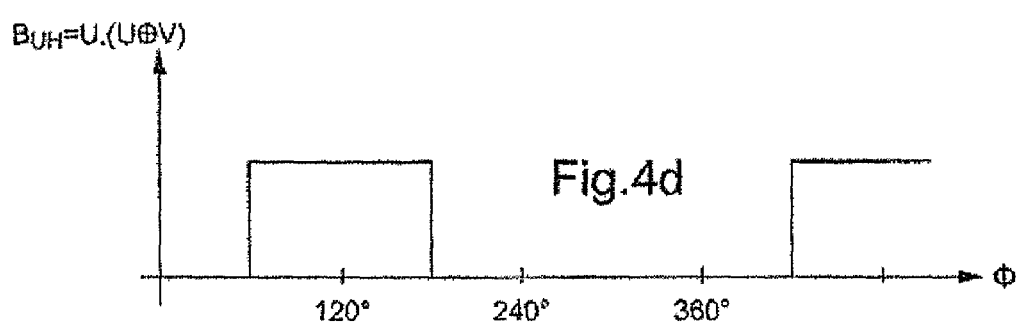
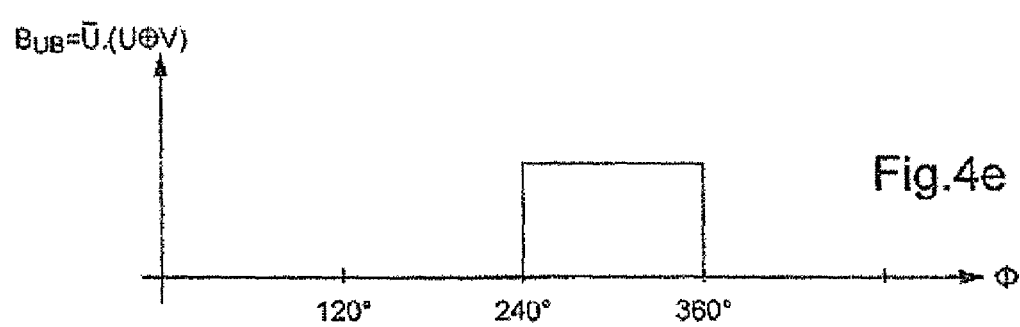

TRIPHASE ROTATING ELECTRICAL MACHINE

CROSS-REFERENCE TO RELATED APPLICATIONS AND CLAIM TO PRIORITY

This application relates to International Application No. PCT/FR2007/051245 filed May 10, 2007 and French Patent Application No. 0651996 filed Jun. 1, 2006, of which the disclosures are incorporated herein by reference and to which priority is claimed.

BACKGROUND OF THE INVENTION

1. Field of the Invention.

The invention concerns a reversible three-phase rotary electrical machine of the alternator starter type.

2. Description of Related Art.

In this type of machine functioning as a starter, various coils evenly spaced apart on the periphery of part of the machine (in general the stator) are supplied successively by a set of switches in order to generate a rotating magnetic field that causes the driving of the other part of the machine (in general the rotor), for its part supplied continuously.

For example, in the case of a delta configuration of the coils (or phases) of the stator, the coils are supplied by the set of switches so as to subject each of the nodes common to two coils, either to a first voltage (for example positive) or to a second voltage (for example zero). Suitable control of the switches thus makes it possible to reverse the current passing through each coil during a rotation period of the machine and therefore to generate the rotating field mentioned above.

In order to generate the control signals for the switches aimed at obtaining such a control, one practical solution consists of placing equally distributed sensors around the rotary machine (here three sensors since it is a case of a three-phase machine) and controlling the switches by means of signals generated by these sensors (directly for the switches applying the first voltage, and with an inversion of the signal for the switches applying the second voltage), according to a technique in general referred to as "full-wave control".

However, according to this solution, the signals issuing from the sensors consisting of two half waves (one positive, the other negative) each extending over half of the period of the signal (that is to say over 180° in terms of phase), the following configuration is obtained at each moment: each node situated between two coils in a delta configuration is connected to one of the voltage sources (because at each moment one of the switches associated with it is closed) and two nodes out of the three are thus connected to the same voltage source and thus short-circuit the coil that separates them.

Because of this, the equivalent resistance of the rotary machine is only equal to half of the resistance of a coil, which may pose a problem under certain operating conditions.

This is for example the case with rotary machines intended to assist a thermal engine during its acceleration phases and the coils of which are sized with a low stator resistance in order to supply high mechanical power at high speed. The currents involved in the low resistance may prove to be destructive for the electronics in other operating circumstances, such as for example starting the thermal engine at high voltage.

The problems disclosed above have been presented in the particular case of a stator having a delta coil configuration. It should be noted however that these problems also exist in the case of a star configuration.

BRIEF SUMMARY OF THE INVENTION

The invention proposes a three-phase rotary electrical machine of the alternator-starter type comprising three windings evenly distributed around a rotation axis of the machine, at least a first sensor able to deliver a periodic signal representing a position of the machine about the said axis and a control circuit able to control, in a first mode (referred to as 180° control), the conduction of a switch associated with at least one coil among the three coils on the basis of the periodic signal delivered by the first sensor so that the conduction phases of the switch have a duration of around half the period of the signal. The switch forms part of a three-arm switch bridge, each arm corresponding to a phase and comprising at least two switches.

In accordance with the invention, the control circuit is able to control the switch according to a second mode (referred to as 120° control) in which the conduction phases of the switch have a duration of around one third of the period of the signal.

In the case of a delta configuration of the coils of the machine, the first mode is the one allowing a low stator resistance and the second mode is the one allowing an increased stator resistance. In the case of a star configuration of the machine coils, the second mode is the one allowing a low stator resistance and the first mode is the one allowing an increased stator resistance.

As will appear clearly hereinafter, the change to a suitable control mode, according to the delta or star configuration of the machine coils, allows an increase in the resistance of the rotary machine and thus a reduction in the current, advantageous in certain conditions as mentioned above.

The control circuit can comprise selection means for selectively activating the first mode or the second mode. The control mode can thus be chosen according to the operating conditions.

The selection means can according to a first possibility activate the first mode or the second mode according to information on the speed of rotation of the machine, for example when the said speed information indicates a rotation speed below a first threshold.

In this way the problems mentioned previously, which arise at low rotation speeds, are avoided.

The selection means can according to a second possibility (possibly combinable with the first) activate the first mode or the second mode according to a voltage of a battery supplying the machine, for example when the battery voltage is below a second threshold. In this way the battery voltage is re-established by virtue of the aforementioned reduction in the current, which limits the voltage drop encountered in certain operating phases.

The control circuit can in practice comprise means for generating, in the second mode, a control signal intended for the switch formed at least on the basis of a combination of the signal delivered by the first sensor and a signal delivered by a second sensor.

For example, the said means for generating the control signal comprise a first logic circuit able to perform an exclusive OR operation between the signal delivered by the first sensor and the signal delivered by the second sensor. In this way control in 120° mode is obtained by means that are relatively simple to implement.

The said means for generating the control signal can comprise a second logic circuit able to perform a logic AND operation between the signal delivered by the first sensor and the result of the exclusive OR operation in order to obtain the control signal for the switch.

The said means for generating the control signal can also comprise means for advancing by 30° the phase of the signals applied to the first logic circuit, which makes it possible to generate a control signal formed by 120° pulses centered on the 180° pulses present in the signal issuing from the first sensor.

Other characteristics and advantages of the invention will emerge in the light of the following description given with reference to the accompanying drawings, in which:

BRIEF DESCRIPTION OF THE SEVERAL VIEWS OF THE DRAWINGS

FIGS. 4a to 4e are timing diagrams that illustrate the behaviour of the various signals involved in FIG. 3;

DETAILED DESCRIPTION OF THE INVENTION

With reference to FIGS. 1 to 6, the invention is now described essentially in the form of a three-phase rotary electrical machine of the type having a delta coil configuration. However, it should be clear to a person skilled in the art that the invention concerns the two conventional types of three-phase electrical machine, namely delta machines and star machines.

Figure 1:
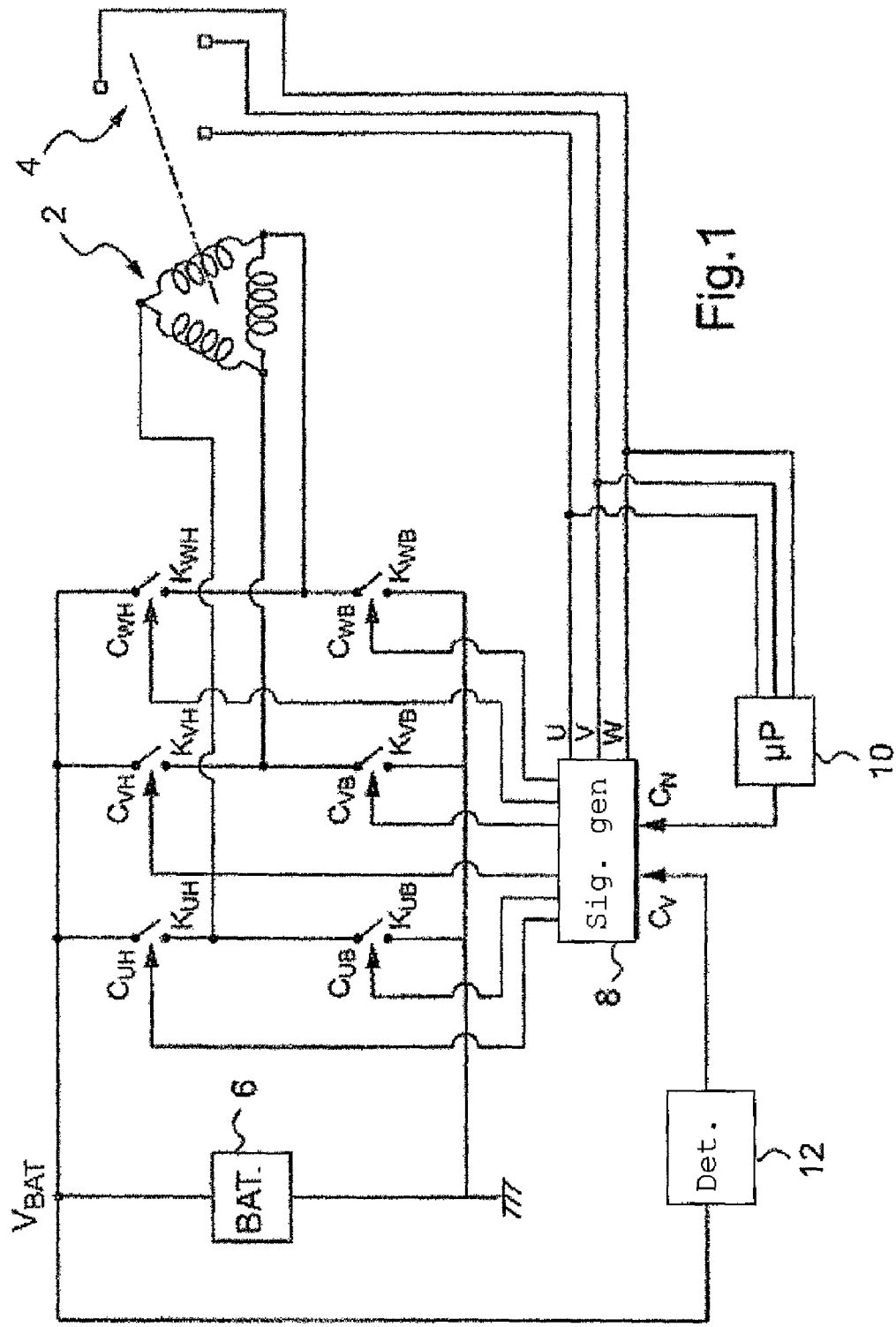
FIG. 1 depicts an example embodiment of a rotary machine according to the teachings of the invention.

FIG. 1 presents the global electrical diagram in which a three-phase rotary electrical machine according to the teachings of the invention is installed.

For reasons of simplification, only the stator 2 of the rotary electrical machine is shown in FIG. 1; the rotary machine also comprises a rotor driven by the rotating magnetic field formed by the stator 2 as described below.

The stator 2 is formed by three windings (or coils) evenly disposed on the circumference of the rotary machine and therefore each spaced apart by 120°.

The windings are connected in a delta. Each node in this circuit separating two windings is connected to a pair of switches, a first switch $K_{UH}$, $K_{VH}$, $K_{WH}$ being able to connect the node concerned to the positive voltage $V_{BAT}$ of a battery 6, the second switch $K_{UB}$, $K_{VB}$, $K_{WB}$ being able to connect the node concerned to earth.

The switches are controlled by control signals generated by a signal generator 8 whose functioning is described in detail hereinafter. Hereinafter the control signal associated with the switch $K_{XI}$ is denoted $C_{XI}$ (that is to say for example $C_{UH}$ is the control signal intended for the switch $K_{UH}$).

Position sensors 4 distributed over the circumference of the rotary electrical machine supply information U, V, W relating to the position of the rotor and are thereby used by the signal generator 8 for constructing the control signals for the switches, as described in detail below.

The sensors can be of the two-state type or linear according to the embodiment envisaged, as explained below.

The signal generator is able to deliver the control signals $C_{UH}$, $C_{UB}$, $C_{VH}$, $C_{VB}$, $C_{WH}$, $C_{WB}$ to the switches according to two main operating modes:

- an operating mode in which the signals U, V, W issuing from the sensors are transmitted to the switches as control signals, except for an inversion, which causes the opening and closing of each switch per half-period (180° control);
- an operating mode in which the signals issuing from the sensors are processed so that the control signals generated by the signal generator 8 cause the conduction of each switch only during a third of a period (120° control).

In all cases, the control signals are also such that two switches associated with the same node (such as the switches $K_{UH}$ and $K_{UB}$) are never closed at the same time. It should be noted on the other hand that the two switches associated with the same node are simultaneously open in certain phases in "120° control" operating mode.

The operating mode (180° control or 120° control) is chosen at each moment according to the operating conditions of the system, for example according to the modalities now described.

In the embodiment described here, a circuit 10 for measuring the rotation speed of the machine (here implemented by a microprocessor that receives the position information U, V, W) transmits a control signal $C_N$ to the signal generator 8 according to the measured rotation speed N.

The signal generator 8 switches its operating mode between the two operating modes mentioned above according to the control signal $C_N$ received from the measuring circuit 10.

According to an embodiment adapted for example to rotary machines intended not only to start a thermal engine but also to assist during more rapid rotations, provision is made for the measuring circuit 10 to generate a control signal $C_N$ imposing operation in "180° control" mode when the measured rotation speed is greater than a threshold $N_0$, while this control signal $C_N$ imposes functioning in "120° control" mode when the measured rotation speed N is below the threshold $N_0$. In practice for example $N_0$=600 rev/min is taken.

There is thus the benefit of the high torque allowed by the 180° control in the phases of assisting the thermal engine (rotation at high speed), while the current is limited by virtue of the 120° control in the low-speed rotation phases (such as for example the starting of the thermal engine). This is because, during the 120° control, a node of the stator 2 is left free (that is to say not connected) at each moment, so that the equivalent resistance of the stator is equal to two thirds of the resistance of a coil, which allows a maximum reduction in the current of approximately 30% compared with the case of the 180° control described in the introduction. Naturally the reduction in the current depends on the resistances present in the circuit and in particular the resistance of the battery.

There is also provided in the embodiment described here a detector 12 for the level of the voltage $V_{BAT}$ of the battery 6 in order to send a control signal $C_V$ to the signal generator 8 that forces the latter to an operating mode of the "120° control" type when the voltage $V_{BAT}$ falls below a voltage threshold (for example 10.5V for a battery supplying a voltage of 12V).

Switching to 120° control mode allows a reduction in the current as explained above and consequently a reduction in the voltage drop at the battery.

The voltage drop measured by the detector 12 in general being created by unwanted phenomena, the detector 12 will preferably be produced in hardware form (rather than software) in order to obtain a sufficiently rapid switching (of around 100 μs) of the operating mode.

Figure 2:
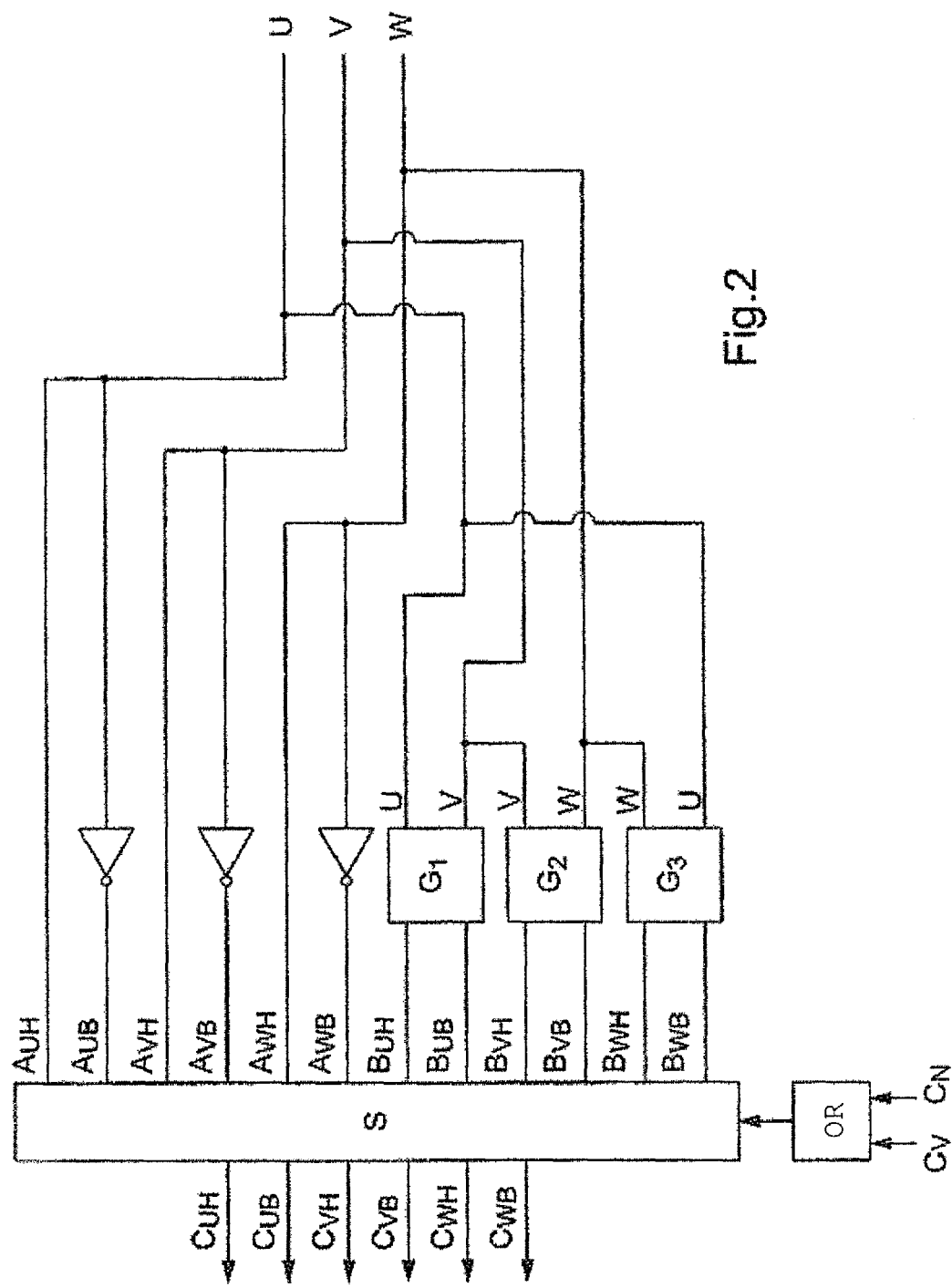
FIG. 2 depicts a possible example embodiment for the signal-generating circuit in FIG. 1.

FIG. 2 depicts an example embodiment of the signal generator 8 of FIG. 1.

In this example the signal generator comprises a first part intended to generate the control signals $A_{UH}$, $A_{UB}$, $A_{VH}$, $A_{VB}$, $A_{WH}$, $A_{WB}$ for the operating mode of the 180° control type.

These signals issue directly from the sensor signals U, V, W for the signals $A_{UH}$, $A_{VH}$, $A_{WH}$ intended for the switches $K_{UH}$, $K_{VH}$, $K_{WH}$ connected to the positive voltage $V_{BAT}$ of the battery and formed by simple inversion of the sensor signals U, V, W for the control signals $A_{UB}$, $A_{VB}$, $A_{WB}$ intended for the switches $K_{UB}$, $K_{VB}$, $K_{WB}$ for their part connected to earth.

In a variant, it would naturally be possible to provide a processing of the sensor signals U, V, W in order to obtain the control signals intended for the 180° control, for example a threshold detection in order to transform the signals issuing from the sensors into two state signals, for example when the sensors are of the linear type.

The signal generator shown in FIG. 2 also comprises a part able to form control signals $B_{UH}$, $B_{UB}$, $B_{VH}$, $B_{VB}$, $B_{WH}$, $B_{WB}$ for the 120° control from the same sensor signals U, V, W. To do this, circuits $G_1$, $G_2$, $G_3$ are used, an example of which will be given hereinafter and which make it possible, from the signals from at least two sensors (for example U and V) to generate a control signal (for example $B_{UH}$) able to cause the conduction of the associated switch (here $K_{UH}$) during only one third of a period (120° control), as well as the control signal for the switch associated with the same node (here $K_{UB}$) with a conduction period here also equal to one third of a period.

All the control signals mentioned above (namely on the one hand the signals $A_{XI}$ and on the other hand the signals $B_{XI}$) are transmitted to the input of a switch S able to select as a control signal $C_{XI}$ intended for the switch $K_{XI}$ either the corresponding signal $A_{XI}$ intended for the 180° control or the corresponding signal $B_{XI}$ intended for the 120° control.

Selection of the switching performed by the switch S is made as already indicated on the basis of the control signals $C_N$ and $C_V$ mentioned above. For example, if the value 1 of each of these signals involves a 120° control, these signals $C_V$, $C_N$ are combined by means of a logic OR operator in order to switch into 120° control mode as soon as one of the conditions mentioned above to do this is encountered.

A description will now be given of an example embodiment of the processing circuits $G_1$, $G_2$, $G_3$. However, merely the structure of the circuit $G_1$ will be described, the structure of the other two circuits being deduced from this easily.

Figure 3:
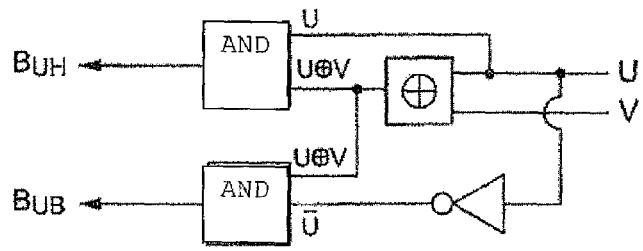
FIG. 3 depicts a possible example embodiment for the circuit G1 in FIG. 2.

FIG. 3 depicts a first example embodiment of the circuit $G_1$ in FIG. 2.

In this example, the circuit $G_1$ comprises an XOR circuit receiving as an input the signals U and V received from the sensors and generating as an output the result of an exclusive OR logic operation between these two values. This result is denoted U⊕V.

The output of the XOR circuit is applied firstly to the input of an AND gate, which also receives as an input the sensor signal U and thus emits as an output the control signal $B_{UH}$ intended for the 120° control of the switch $K_{UH}$.

The signal emitted by the XOR circuit is also applied to the input of another AND gate, which receives at its other input the signal $\overline{U}$, which makes it possible thus to form the control signal $B_{UB}$ intended for the 120° control of the switch $K_{UB}$.

FIGS. 4a to 4e depict the behaviour during a period (phase φ shown on the X-axis) of the various signals present in the circuit in FIG. 3a.

FIGS. 4a and 4b depict respectively the signals emitted by the corresponding sensors, the signal V having a phase lead of 120° with respect to the signal U because of the arrangement of the sensors.

FIG. 4c depicts the signal U⊕V formed by virtue of the XOR circuit. Because of the use of an exclusive OR logic, the non-zero parts of the signal U⊕V correspond to the times when only one of the signals U and V is not zero, which makes it possible to generate pulses with a width of 120° (from the signals U and V both formed by pulses with a width 180°).

FIGS. 4d and 4e depict respectively the control signals $B_{UH}$ and $B_{UB}$ obtained by means of the circuits in FIG. 3: the pulses of the signal U⊕V visible in FIG. 4c are alternatively found in only one of the control signals $B_{UH}$ and $B_{UB}$ by virtue of the respective application of the signal U and of the signal $\overline{U}$ by means of the AND gates.

A second embodiment of the signal generator 8 in FIG. 1 will now be described with reference to FIGS. 5 and 6.

In this example embodiment, control signals in phase with the 180° signals received from the corresponding sensor are formed for the 120° control operating mode.

The example described here uses linear sensors (sometimes called "pseudo-sine").

Hereinafter a description is given in detail of the parts of the generating circuit able to generate the control signals $C_{UH}$ and $C_{UB}$ intended for the switches $K_{UH}$ and $K_{UB}$, the other parts intended to form the other control circuits being deduced from this by analogy.

Figure 5:
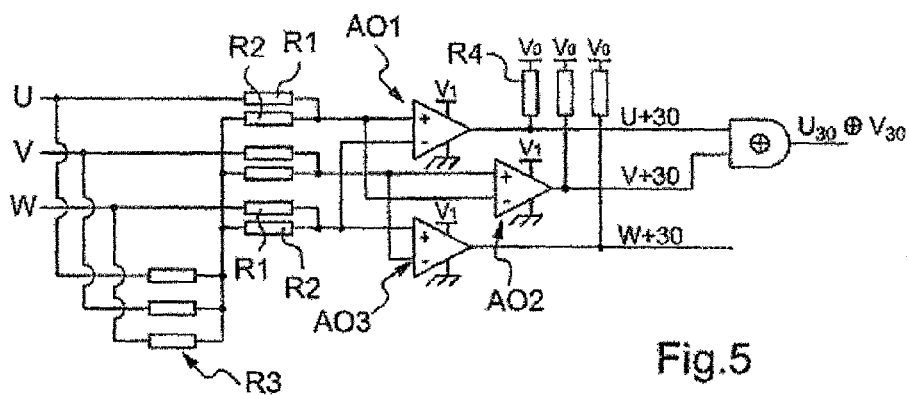
FIG. 5 depicts a first part of another possible embodiment for the signal-generating circuit in FIG. 1.

As can be seen in FIG. 5, the signal U issuing from a sensor is applied to the positive input of a comparator AO1 through a resistor R1. The operational amplifier is supplied in a conventional manner by a voltage $V_1$ (here $V_1$=15V).

The comparator AO1 receives at its negative input the signal W through a resistor, also of value R1.

It should also be noted that, on each of the inputs of the comparator AO1 there is also applied through a resistor R2 the combination of the three sensor signals U, V, W, this combination being obtained by applying each of the signals to a common node through a resistor R3. In practice R2=120 kΩ and R3=8.2 kΩ. This application of the combination of the three signals makes it possible always to work with positive signals.

The output of the comparator AO1 is connected to a voltage source $V_0$ (here $V_0$=5V) through a resistor R4 (here R4=4.7 kΩ). Thus, by virtue of the subtraction of the signal W from the signal U used by the comparator AO1 and by virtue of the linearity of the signals because of the sensors used, a periodic signal $U_{+30}$ in phase lead of 30° with respect to the signal U is obtained at the output of the amplifier.

As can be seen in FIG. 5, the signals V and U are applied in the same way respectively to the positive and negative inputs of a comparator AO2 in order to obtain at the output a periodic signal $V_{+30}$ in phase lead of 30° with respect to the signal V.

Likewise the signals W and V are applied respectively to the positive and negative inputs of a comparator AO3 in order to obtain as an output a periodic signal $W_{+30}$ in phase lead of 30° with respect to the signal W. However, this signal $W_{+30}$ not being used for the control signals $C_{UH}$ and $C_{UB}$ described here, mention of this will not be made hereinafter. It is naturally in practice used for the construction of the other control signals according to a technique similar to that now described.

The signals in phase lead of 30° $U_{+30}$ and $V_{+30}$ are respectively applied to the two inputs of a logic circuit performing an exclusive OR operation, in order to obtain a signal denoted $U_{30}$⊕$V_{30}$.

Figure 6:
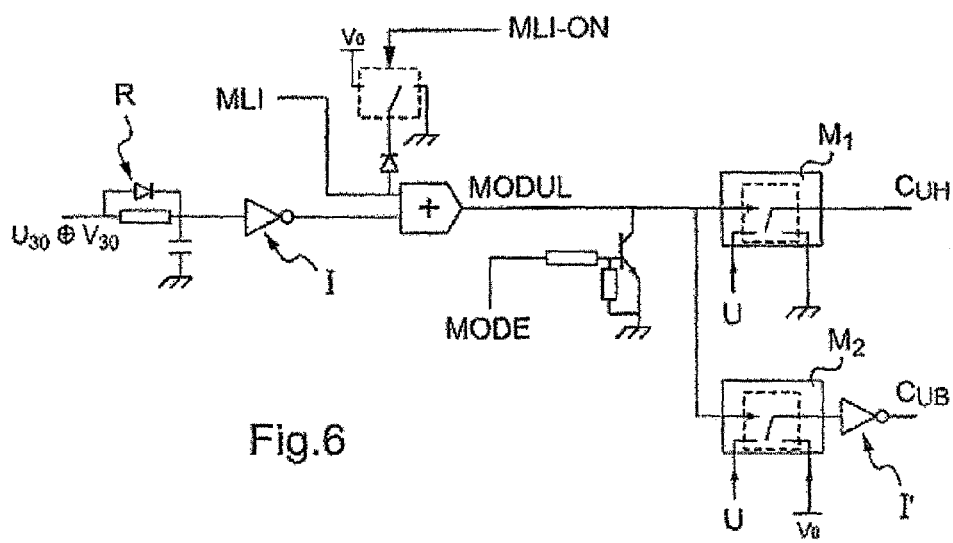
FIG. 6 depicts a second part of the circuit in FIG. 5.

According to the embodiment described here, this signal $U_{30}$⊕$V_{30}$ is used to form the control signals $C_{UH}$ and $C_{UB}$ as illustrated in FIG. 6 and described below.

According to a variant that can be envisaged, this signal $U_{30}$⊕$V_{30}$ could be used in place of the signals U⊕V in the embodiment in FIG. 3. In this way pulses of the same type as those illustrated in FIGS. 4d and 4e would be obtained, but centered on the pulses (of length 180°) in FIG. 4a by virtue of the phase lead of 30°. The logic combination $U_{30} \oplus V_{30}$. U applies in this case.

Returning to the second embodiment, of which the part now described is illustrated in FIG. 6, it will be observed that there are applied successively to the signal $U_{30} \oplus V_{30}$:

an inversion by means of an inverter circuit I;

the possible addition of a signal MLI composed of high-frequency pulses, the addition being able to be made or not according to the command received from a signal MLI-ON, emitted for example by the microprocessor 10 according to the operating conditions. It should be noted that the addition of a signal MLI may advantageously make it possible to reduce the mean current in the critical phases.

In this way a signal MODUL is obtained able to modulate the signal U during the 120° control operating mode as described below.

This is because, for this purpose, a transistor T controlled by a signal MODE indicating the control mode (180° mode or 120° mode) is able to transmit (transistor off) or not (transistor on, which causes the earthing of the signal MODUL) the signal MODUL to the control input of two multiplexers M1, M2 (for example of the 74HC153 type). The signal MODE is for example obtained by the logic combination by means of an OR operator of the signals $C_N$ and $C_V$ as indicated in the first embodiment.

It may be remarked that the transistor T thus participates in the switching between the two operating modes (the function performed by the switch S in the first embodiment).

The multiplexer M1 is also supplied at its first input by the sensor signal U whilst its second input is earthed.

Thus, when the signal MODE indicates a 180° control mode, the control signal is permanently zero so that the multiplexer M1 emits as an output a signal $C_{UH}$ identical to the signal U received at its first input.

On the other hand, when the signal MODE indicates a 120° control mode, the control signal is the signal MODUL previously constructed (principally by inversion of $U_{30} \oplus V_{30}$) so that the output $C_{UH}$ of the multiplexer M1 is forced to zero (the value of the second input of M1) when the signal MODUL is high (that is to say mainly when the signal $U_{30} \oplus V_{30}$ is low) and follows the signal U the rest of the time.

In this way a signal $C_{UH}$ is obtained whose phases that control the conduction of the switch $K_{UH}$ extend over 120° and are centered with respect to the high periods of the signal U.

Likewise the signal $C_{UB}$ is obtained as illustrated in FIG. 6 by application of the signal U to the first input of the multiplexer M2 and putting its second input to the high potential $V_0$, with inversion by means of an inverter circuit I'.

The invention claimed is:

1. A three-phase rotary electrical machine of an alternator-starter type, the electrical machine comprising:
   coils evenly distributed about a rotation axis of the machine;
   a switch associated with at least one coil of the coils, the switch forming part of a switch bridge with three arms, each of the arms corresponding to a phase and comprising at least two switches;
   a first sensor provided to deliver a periodic signal representing a position of the machine about the axis; and
   a control circuit provided to control, in a first mode, the conduction of the switch associated with at least one coil of the three coils on the basis of the periodic signal delivered by the first sensor so that conduction phases of the switch have a duration of around half the period of the periodic signal;
   the control circuit provided to control the switch in a second mode in which the conduction phases of the switch have a duration of around one third of the period of the periodic signal.

2. The rotary electrical machine according to claim 1, wherein the control circuit comprises selection means for selectively activating one of the first mode and the second mode.

3. The rotary electrical machine according to claim 2, wherein the selection means are provided to activate one of the first mode and the second mode according to information on a rotation speed of the machine.

4. The rotary electrical machine according to claim 3, wherein the selection means are provided to activate the second mode when the speed information indicates the rotation speed below a first threshold.

5. The rotary electrical machine according to claim 2, wherein the selection means are provided to activate one of the first mode and the second mode according to a voltage of a battery supplying the machine.

6. The rotary electrical machine according to claim 5, wherein the selection means are provided to activate the second mode when the battery voltage is below a second threshold.

7. A three-phase rotary electrical machine of an alternator-starter type, the electrical machine comprising:
   coils evenly distributed about a rotation axis of the machine;
   a switch associated with at least one coil of the coils, the switch forming part of a switch bridge with three arms, each of the arms corresponding to a phase and comprising at least two switches;
   a first sensor and a second sensor each provided to deliver a periodic signal representing a position of the machine about the axis; and
   a control circuit provided to control, in a first mode, the conduction of the switch associated with at least one coil of the three coils on the basis of the periodic signal delivered by the first sensor so that conduction phases of the switch have a duration of around half the period of the periodic signal;
   the control circuit provided to control the switch in a second mode in which the conduction phases of the switch have a duration of around one third of the period of the periodic signal;
   the control circuit comprising means for generating, in the second mode, a control signal intended for the switch and formed at least on the basis of a combination of the signal delivered by the first sensor and the signal delivered by the second sensor.

8. The rotary electrical machine according to claim 7, wherein the means for generating the control signal comprise a first logic circuit able to perform an exclusive OR operation between the signal delivered by the first sensor and the signal delivery by the second sensor.

9. The rotary electrical machine according to claim 8, wherein the means for generating the control signal comprise a second logic circuit able to perform a logic AND operation between the signal delivered by the first sensor and the result of the exclusive OR logic operation.

10. The rotary electrical machine according to claim 8, wherein the means for generating the control signal comprise means for advancing by 30° the phase of the signals applied to the first logic circuit.

* * * * *